(12) United States Patent
Koenig

(10) Patent No.: US 11,279,567 B2
(45) Date of Patent: Mar. 22, 2022

(54) METHOD FOR WEAR DETECTION, AND CONVEYING SYSTEM WITH WEAR DETECTION

(71) Applicant: SIEMENS AKTIENGESELLSCHAFT, Munich (DE)

(72) Inventor: Frank Koenig, Dubai (AE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/254,400

(22) PCT Filed: May 27, 2019

(86) PCT No.: PCT/EP2019/063648
§ 371 (c)(1),
(2) Date: Dec. 21, 2020

(87) PCT Pub. No.: WO2019/242999
PCT Pub. Date: Dec. 26, 2019

(65) Prior Publication Data
US 2021/0188566 A1    Jun. 24, 2021

(30) Foreign Application Priority Data
Jun. 19, 2018   (EP) ..................... 18178668

(51) Int. Cl.
*B65G 43/02* (2006.01)
*B65G 21/22* (2006.01)
*B65G 23/04* (2006.01)

(52) U.S. Cl.
CPC ............. *B65G 43/02* (2013.01); *B65G 21/22* (2013.01); *B65G 23/04* (2013.01);
(Continued)

(58) Field of Classification Search
None
See application file for complete search history.

(56) References Cited

U.S. PATENT DOCUMENTS 4,359,945 A * 11/1982 Brems .................. B65G 13/075
198/465.4
7,568,641 B2   8/2009 Dreimann et al.
(Continued)

FOREIGN PATENT DOCUMENTS

| CN | 2639247 Y | 9/2004 |
|---|---|---|
| CN | 1918522 A | 2/2007 |

(Continued)

*Primary Examiner* — Kavel Singh
(74) *Attorney, Agent, or Firm* — Laurence A. Greenberg; Werner H. Stemer; Ralph E. Locher

(57) ABSTRACT

A method for wear detection during the operation of a conveying system having a closed circulating path, a pick-up which is attached to at least one running gear and which makes contact with a surface of a rail in the case of wear of the wheel and/or the rail, includes using a sensor coupled to the pick-up to register vibrations produced by the contact. The vibrations are transmitted wirelessly to a background system and are evaluated. The method and a conveying system allow wear detection, in particular in the case of closed conveying systems, and considerably reduce maintenance complexity.

12 Claims, 4 Drawing Sheets

(52) U.S. Cl.
CPC ............ *B65G 2201/0264* (2013.01); *B65G 2203/0275* (2013.01); *B65G 2203/042* (2013.01); *B65G 2207/48* (2013.01); *B65G 2812/02069* (2013.01)

(56) References Cited

U.S. PATENT DOCUMENTS

| | | |
|---|---|---|
| 9,227,793 B2 | 1/2016 | Rathmann et al. |
| 9,376,263 B2 * | 6/2016 | Nancarrow ............ B65G 43/02 |
| 9,896,276 B2 * | 2/2018 | Brown ................... B65G 43/02 |
| 11,014,761 B2 * | 5/2021 | Johnson ................. B65G 17/38 |
| 2004/0206606 A1 | 10/2004 | Hochhaus et al. |
| 2011/0278137 A1 | 11/2011 | Evans |
| 2017/0027808 A1 | 2/2017 | Castiglione |
| 2017/0283183 A1 | 10/2017 | Erceg |

FOREIGN PATENT DOCUMENTS

| | | |
|---|---|---|
| CN | 103458040 A | 12/2013 |
| CN | 104053616 A | 9/2014 |
| EP | 1469278 A1 | 10/2004 |
| EP | 3214423 A1 | 9/2017 |
| JP | H0534139 A | 2/1993 |
| JP | 2004238141 A | 8/2004 |
| JP | 2007137595 A | 6/2007 |
| RU | 2007103790 A | 8/2008 |
| WO | 2018002708 A1 | 1/2018 |
| WO | 2018015290 A1 | 1/2018 |

* cited by examiner

METHOD FOR WEAR DETECTION, AND CONVEYING SYSTEM WITH WEAR DETECTION

BACKGROUND OF THE INVENTION

Field of the Invention

The present invention relates to a method for wear detection when operating a conveying system and also to a conveying system with wear detection according to the independent claims.

In particular, the present invention relates to the technical field of conveying systems within an airport for baggage items and piece goods. Every airport operator aims to reduce failures in baggage handling to a minimum. In practice, this means that the baggage conveying systems are kept "live" during operation and the time-based maintenance is performed outside of operating times. "Supervisory Control and Data Acquisition" systems, referred to as SCADA systems in the following, monitor and control technical processes by means of a computer system and are frequently used in the monitoring of airport baggage conveying systems. SCADA makes it possible for airport operators and operators of other systems to monitor the operating states of entire systems.

A SCADA system is able to indicate failures of portions of a conveying system, for example when these portions are no longer available for baggage handling. Smaller problems, such as interruptions to the flow of materials, for example caused by wedged baggage items, can be rectified in a very rapid manner, meaning that the portion in question can return to the normal operating state. Component failures which are caused by wear, however, mostly cannot be rectified without significant impacts on the availability and capacity of the system. These failures may lead to major problems for the airport operator and the operator of other systems.

To date, this problem has been solved by what is known as "preventive maintenance" and entails the preventive maintenance of components at predetermined maintenance intervals. This time-based maintenance strategy is elaborate, however. Moreover, maintenance activities take place on individual components which would not yet even actually be necessary. In addition, the deterioration of individual, identical components is not uniform, meaning that some components are maintained too frequently, while other components are maintained too late, and that failures nonetheless arise despite regular maintenance intervals. For this reason, time-based or preventive maintenance programs are increasingly being replaced by a program for corrective maintenance, known as Run-to-Failure (RTF) or reactive maintenance. This reactive maintenance leads to failed components, which have to be repaired or replaced during ongoing operation, which may lead to system downtimes and to contractual penalties for baggage items which have been delivered late. These contractual penalties are to be paid by the airport operators to the airlines. In addition, high costs arise for the repair or the replacement due to sudden breakdown, not least because the maintenance personnel have to be available for immediate deployment, similar to a fire department.

An airport baggage claim carousel (or reclaim carousel) returns checked baggage to incoming passengers. The baggage is generally fed to the baggage claim carousel from above or below via feed belts and then distributed to a moving, circulating conveyor belt (or reclaim belt). It is conventional for this type of system to have two feed belts, which increases the feed capacity with which the baggage is delivered to the circulating conveyor belt and thus to the passengers. The circulating conveyor belt of a baggage claim carousel typically consists of a conveyor belt operating by friction, which comprises modular units assembled to form an endless loop, with the main components thereof being straight conveyor sections, normal curves, reverse curves and drive units.

Reference is made below to FIGS. 1 and 2. Baggage claim carousels 1, depending upon their size and configuration, have one or more drive units 16 in a straight bed, usually at the end of the straight conveyor section portion under the greatest load.

For redundancy reasons, baggage claim carousels 1 are typically driven by two drive units 16, which are connected via a freely spinning coupling (bicycle principle). An individual drive unit 16 is dimensioned such that it can drive a conveyor belt 10 with a length of up to 75 m along the closed circulating path 2. Typically, rubber blades 11 of the conveyor belt are 1200 mm long and 8 mm thick. A pressed steel blade carrier or running gear 13 is attached at each chain link with a spacing distance of 250 mm and carries supporting wheels 12 with polyurethane tires and a guide wheel 15 for a quiet, smooth operation. Rubber blades 11 and supporting buffers 19 are attached at each carrier, in order to create a continuous support area.

Baggage claim carousels 1 are located in the arrivals hall and their wearing parts such as rollers 13 and rails 18 are concealed behind a cover. For a preventive maintenance, access is time-consuming and labor-intensive, particularly also due to the high number of parts to be inspected. Baggage claim carousels 1, like conveyor belts, operate on a closed circulating path 2 of up to several hundred meters in length. Baggage claim carousels 1 contain two rails 18 and, approximately every half a meter, a polyurethane cylinder rolls on each rail 18 as a transport roller 13. A large airport operates up to 100 or even more of such baggage claim carousels 1. Compared to other components used for baggage handling, baggage claim carousels are highly reliable during operation. For this reason, due to cost-effectiveness considerations, they are usually not even maintained, but rather are operated until a failure occurs during ongoing operation.

Abrasive wear occurs when there is a solid object, the material of which has the same or an even greater hardness than the material of the transport rollers 12 or the rails 18. Adhesive wear occurs due to the effect of friction between surfaces of transition points. If these transition points have materials of different hardnesses, then the softer material is subjected to a shearing and is transferred onto the harder material as a result, see FIG. 3.

The wear on the rails 18 is caused by deposits, which can be traced to an abrasion under heavy load. Abrasive wear particularly occurs when abrasive particles are additionally broken during the deterioration. In addition, transport rollers 12 are worn when they are blocked by an object O. Blocked transport rollers 12, i.e. transport rollers 12 which are not rolling as intended, are subjected to heavy friction and high temperatures associated therewith, and lose material as a result.

For this reason, it is important to detect imminent failures of components of the conveying system as early as possible, in order for an operating failure of the conveying system during operating time to still be able to be prevented and for the repair to be able to be performed immediately once an out-of-service period begins. Such a maintenance strategy would be particularly important for airport and system operators, but is not yet available on the market to date.

The document [1] discloses a wireless monitoring apparatus for detecting an abrasion state for the tensile cable groove of a wheel. To this end, a wireless sensor is employed, which captures the detected abrasion as deterioration state information and transmits this to a management platform. Regular inspections by skilled personnel are dispensed with as a result. This apparatus cannot be used economically for conveying systems, as a very large number of sensors would have to be placed for this and the economic benefit would remain low overall due to the large number.

The publication [2] describes an apparatus and a method for automatically detecting the state of wear of mobile wheels or rollers in conveying-technology installations, such as baggage conveying installations. The apparatus described in [2] and the method described achieve the object of automatically capturing the state of wear in a simple and secure manner in terms of measuring technology when a roller to be examined passes through the installation. This takes place by way of a measuring station arranged in a stationary manner in the conveying path of the installation, in which deviations of the diameter of the wheel or the roller from a predefined setpoint diameter can be captured and signaled in a contactless manner. The disadvantage of this solution is that the wear detection is restricted to rollers and it is not possible to detect states of wear of rails.

SUMMARY OF THE INVENTION

The object underlying the present invention is therefore to specify a method for wear detection during operation of a conveying system, which detects wear with an indication of the wear point (=wear location) with little equipment outlay, therefore permitting a wear detection to take place as far in advance of a system failure as possible. Likewise, a conveying system is to be specified, in which the aforementioned wear detection is realized.

This object is achieved by the measures specified in the independent claims.

The solution according to the invention is characterized by a method for wear detection during operation of a conveying system, which is formed of at least one running gear circulating in a closed path, wherein the running gear contains transport rollers, which are moved on rails, and wherein a pick-up, which has a predefined distance from the rail surface, is fastened to the running gear. In the event of wear on the transport roller and/or on the rail which occurs due to operation, the pick-up touches the rail surface and is made to oscillate as a result. An oscillation sensor coupled to the pick-up registers the oscillations. The registered oscillations are transmitted wirelessly to a background system by the oscillation sensor, together with a time stamp and an identity of the oscillation sensor. In the background system, the transmitted data is subjected to an analysis and, in the event of deviations, is detected as wear and signaled by a message.

The solution according to the invention is further related to a conveying system, which is formed of at least one running gear circulating on rails in a closed path, wherein the running gear contains transport rollers and a pick-up, which has a predefined distance from the rail surface, is fastened to the running gear, wherein a) in the event of wear on the transport roller and/or on the rail which occurs during operation of the conveying system, the pick-up touches the rail surface and is made to oscillate as a result;

b) an oscillation sensor, which registers the oscillations, is coupled to the pick-up;

c) the registered oscillations are transmitted wirelessly to a background system by the oscillation sensor, together with a time stamp and an identity of the oscillation sensor;

d) in the background system, the wirelessly transmitted oscillations and the time stamp are subjected to an analysis and deviations are detected as wear and signaled by a message.

Thus, the following advantages may additionally be produced:

i) By way of the solution according to the invention, wear on a transport roller or on a rail can be detected before a system failure occurs, and the maintenance work can be started in a timely manner.

ii) The solution according to the invention is particularly suitable for conveying systems in which running gears and rails are concealed and can only be inspected and, if necessary, repaired by opening covers.

Preferably, oscillation sensors are employed which, in addition to the registered oscillation data, also transmit their state data, such as remaining battery capacity and temperature for example. A monitoring of the sensors themselves is also ensured as a result, and the maintenance expenses are considerably reduced once more as a result.

In a preferred embodiment, it is also provided that sensors are attached to the rails, in order to be able to detect wear on the transport rollers at an early stage, e.g. a flat point on a transport roller as a result of a blockage due to a foreign object.

Further advantageous embodiments of the invention are specified in the dependent claims.

The invention is explained in greater detail below on the basis of the drawing.

DETAILED DESCRIPTION OF THE INVENTION

Figure 1:
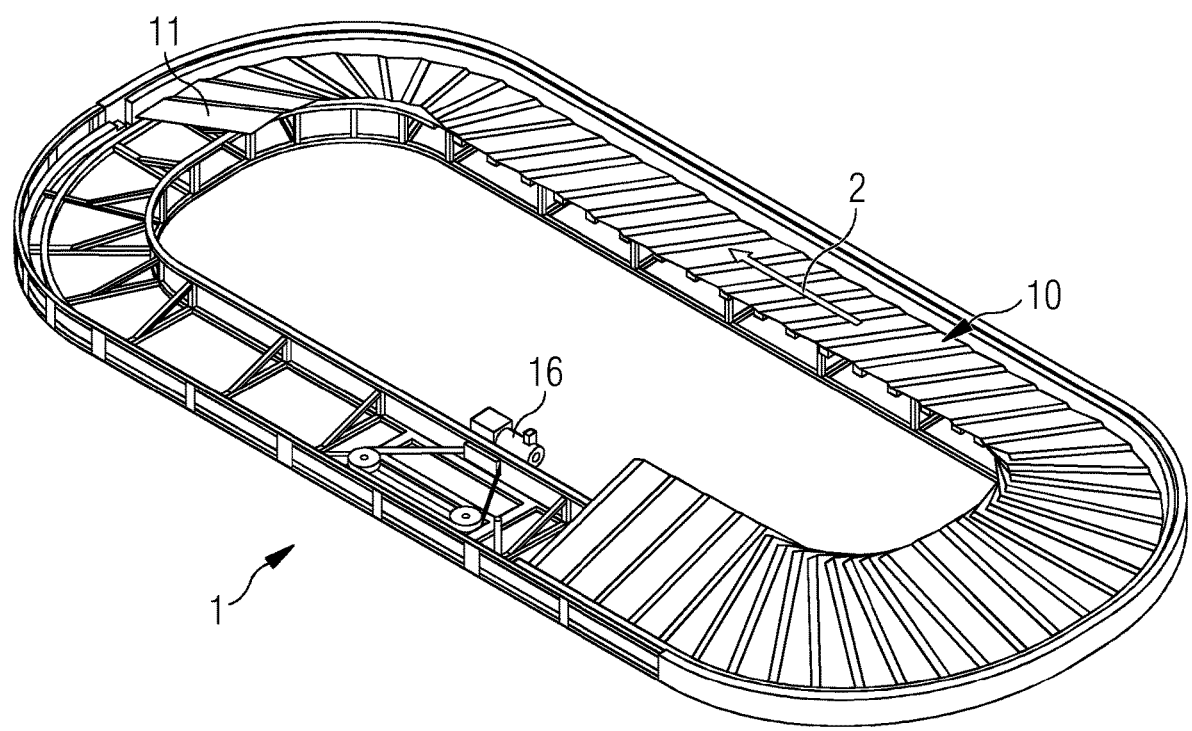
FIG. 1 shows a perspective view of a partially opened baggage claim carousel.
Figure 2:
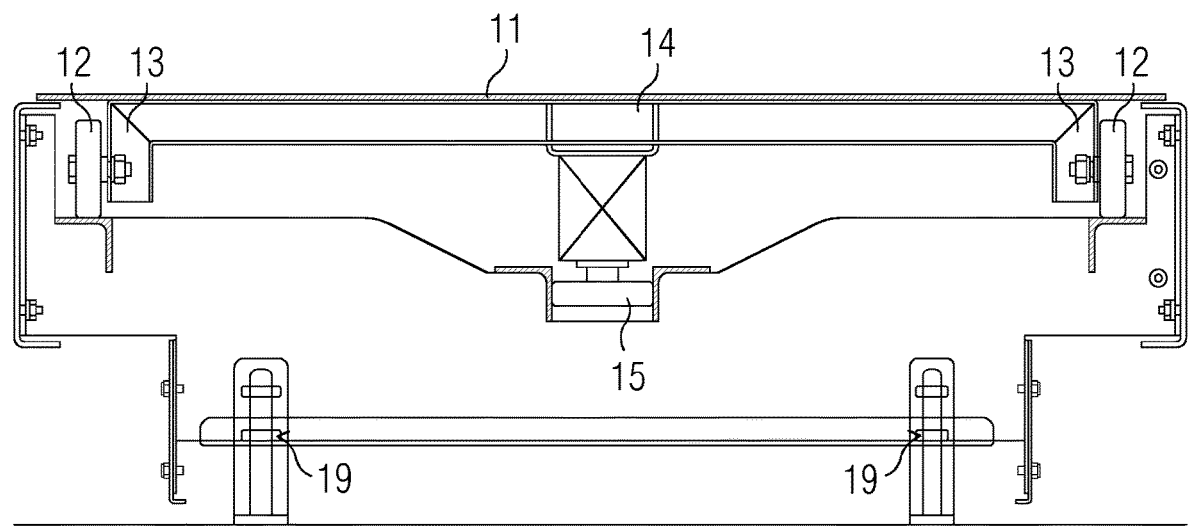
FIG. 2 shows a cross-sectional representation of a baggage claim carousel.
Figure 6:
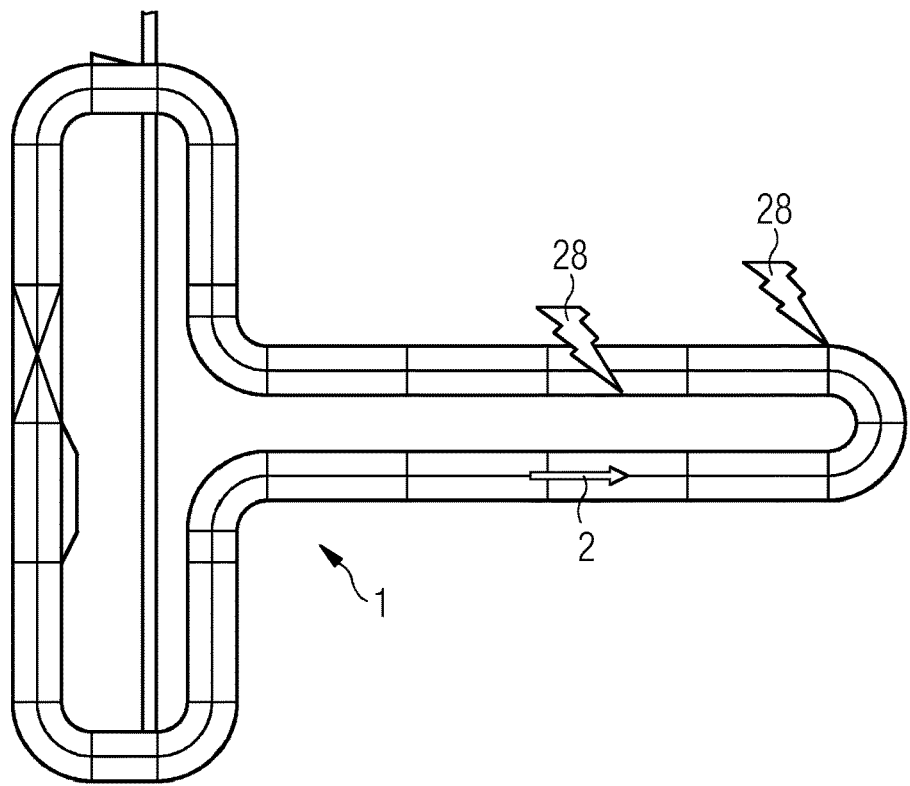
FIG. 6 shows representations of the detected location of wear points on a conveying system.

The exemplary embodiment described in detail below relates to a baggage claim carousel. The invention is not restricted to a baggage claim carousel, however, but rather can be applied to any kind of conveying system which have a closed circulation and comprise at least one running gear, the at least two rollers or wheels of which are each moved on a rail. One example of such closed circulations can be seen in each of FIGS. 1 and 6.

Figure 4:
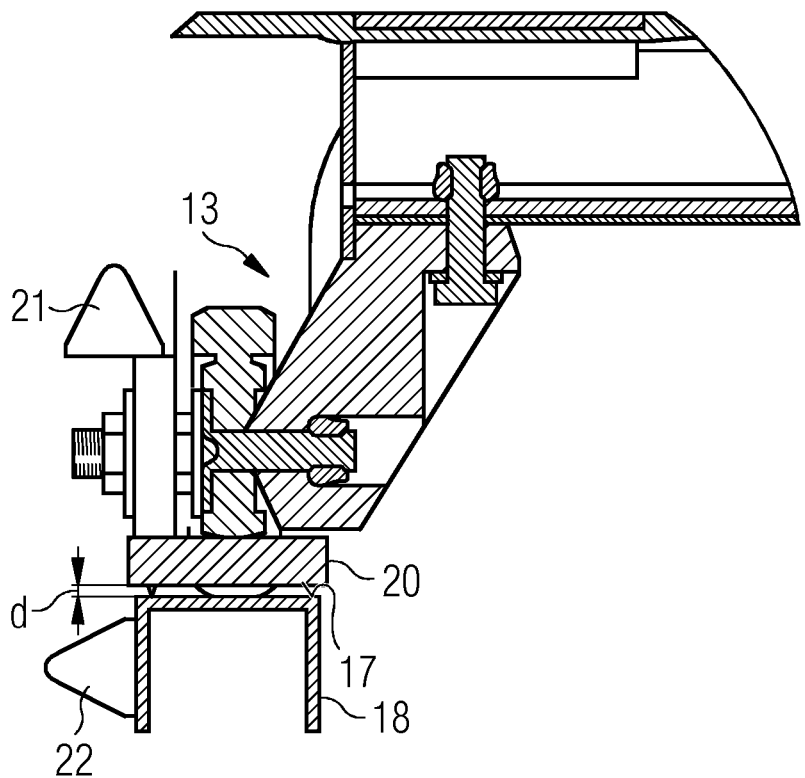
FIG. 4 shows an arrangement of sensors in a baggage claim carousel.

The specific design of the detection of wear points 28 is described on the basis of FIG. 4. FIG. 4 shows a running gear 13 with a wheel 12, also referred to as transport roller 12, which rolls on the rail surface 17 of a rail 18. As the running gear 13 is guided by a further guide roller 15, the rails are embodied in a flat manner, i.e. not guided by way of the flange of a wheel in the manner of a railway track.

Fastened to the running gear 13 is a pick-up 20, the distance d of which from the rail surface can set in a fixed manner and amounts to a few millimeters at most. When the conveying system is operated, wear V results on either the wheel 12 or a part of the rail 18, as is clearly shown on the right in FIG. 3. Due to this wear V, the pick-up 20 will touch the rail surface 17 at a given point in time. This produces a scraping noise or oscillations which are registered by a sensor 21. This principle is comparable to the needle of a record-player, which touches a record, and aims for automatic 24/7 wear inspection, thus making manual checking superfluous; 24/7 stands for 24 hours a day, 7 days a week.

A wireless, battery-operated sensor 21 is mechanically coupled to the pick-up 20 and registers the oscillations/vibrations of the pick-up 20. In order to register the vibrations, the sensor 21 performs a 3-axis acceleration measurement. The registered oscillations are transmitted to a gateway 23 attached in the conveying system 1, together with an identity of the sensor 21.

Figure 5:
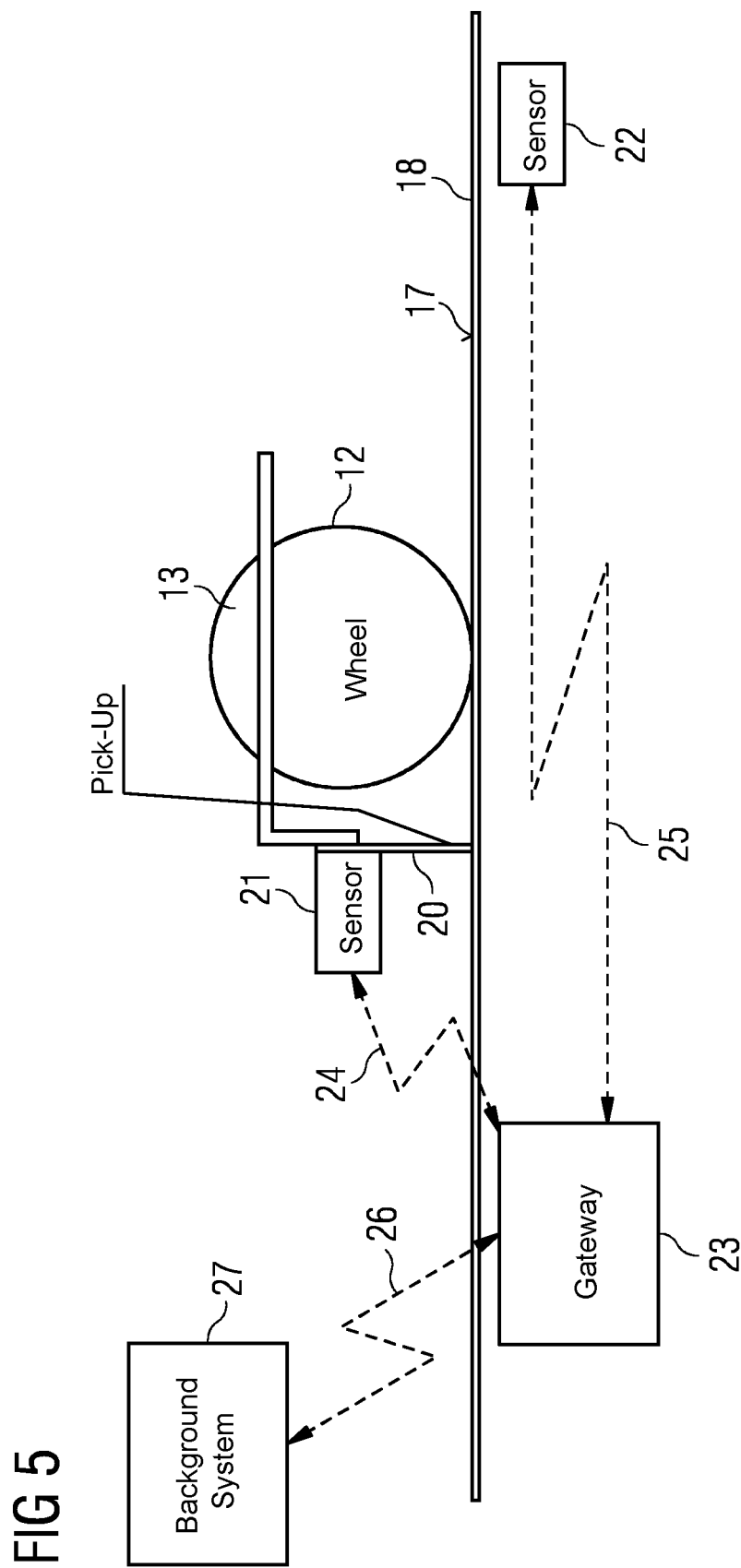
FIG. 5 shows a representation of the communication paths of sensors, gateway and background system.

For ascertaining the location of a wear point, reference is made to FIG. 5. As explained above, the running gear 13 carries out a closed circulation and, on each circulation, also travels past in the immediate vicinity of the gateway 23. By way of a permanent or cyclical communication 24 between sensor 21 and gateway 23, a zero time is defined on each pass as a result. This gateway 23 therefore has a function of a beacon. During this transmission of the oscillations, a time stamp is also available, which contains a relative time in relation to the zero time. As the circulating velocity of such conveying systems is known and is typically constant, the point of an excessively strong oscillation—and thus a wear point V—can be determined on the basis of a touching of the pick-up 21 to the rail surface 17 relative to the location of the gateway 23. "Relative to the location" stands for the length of the path traveled and not, for example, for a point-to-point distance between gateway and wear point V. Additionally, a time of day can also be assigned to each registration of a sensor 21 or 22 in the background system.

Figure 3:
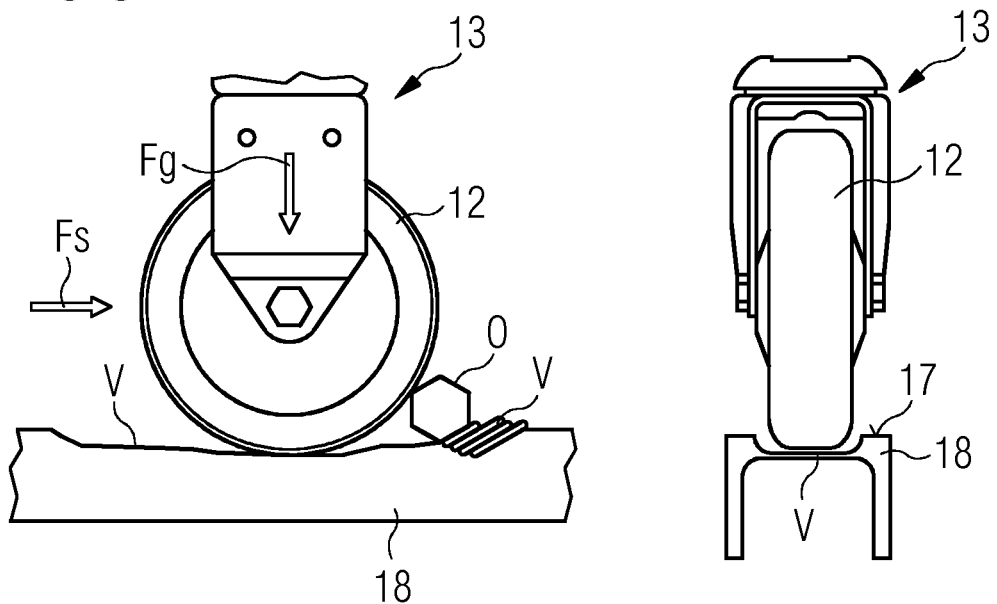
FIG. 3 shows representations of wear points on a rail.
Figure 7:
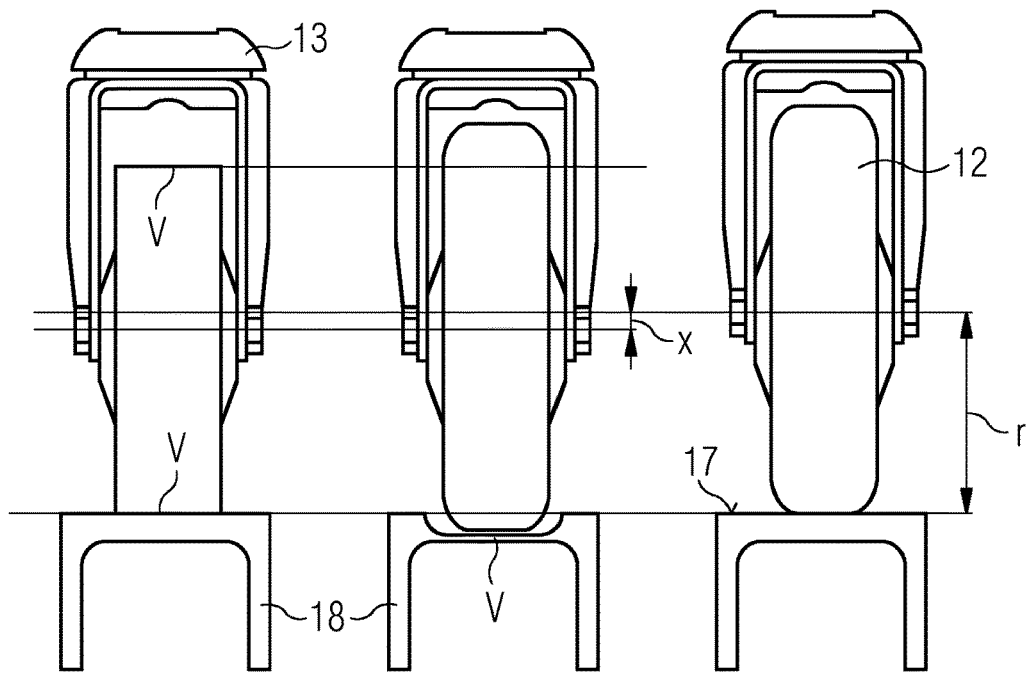
FIG. 7 shows a representation of the various (wear) states of the wheel and rail.

For explaining the types of wear, reference is made to FIG. 3 and FIG. 7. A rail 18 with wear V on the rail surface 17 is shown on the right in FIG. 3. The wheel 12 is intact here. The pick-up 20 is not shown on the right in FIG. 3. It is immediately apparent, however, that the pick-up 20 comes into contact with the original rail surface to the left and right of the wear V, and is therefore made to oscillate, which can be registered by the sensor 21. FIG. 7 shows on the right a new state of the wheel 12 and rail 18 or rail surface 17. The distance (=radius) between the axis of rotation of the wheel 12 and the rail surface 17 is designated r. Wear V on the rail 18 is shown in the center of FIG. 7; wear V on a wheel 12 is shown on the left in FIG. 7. What is common among both types of wear is that the axis of rotation is displaced by a distance x in relation to the original location.

The touching of the pick-up 20 to the rail surface 17 leads to an increase in the oscillation velocity and/or oscillation amplitude.

By way of the pick-up 21, the sensor 21 detects an increase in the oscillation velocity, which is caused by foreign objects O. Such foreign objects may block the wheels, as shown on the left in FIG. 3 for example. It is anticipated that, during normal operation, wheels transfer oscillations (peak-to-peak velocity) of approx. 5 mm/s to the rail and generate "blocked" wheel oscillations of approx. 85 mm/s. "Blocked" wheel oscillations are understood to mean oscillations which are generated by wheels which have an inhomogeneous wear in the form of a flat point due to a blockage mentioned above.

In addition to the sensor 21 on the running gear 13, one sensor 22 may be attached to each rail 18—i.e. on the left and on the right—which is of the same type as the sensor 21 and registers the oscillations mentioned above caused by wheels with flat points via communication 25.

The data received by the gateway 23, i.e. at least the triple consisting of frequency/amplitude, time stamp and identity of the sensor, is transmitted via communication 26 to a background system 27—e.g. to a cloud—where it is analyzed by means of a signal processing server by
   comparison with the previously received triples,
   statistical evaluation over time.

If, during this analysis, a significant deviation is ascertained, then a message can be transmitted to the operator which indicates the installation and the location in the installation, in order to be able to deploy maintenance personnel. Stored in the background system 27 are further installation parameters, in particular an assignment of identity of a sensor to an installation and assignment of identity of a sensor to a track and wheel 12 or to a rail 18.

"All-in-one" "Bluetooth Low Energy" BLE-capable sensors are provided as sensors 21, 22, which are referred to as "vibration BLE sensors" here.

A conveying system 1 preferably possesses at least two fixed sensors 22 which are fastened to rails 18 and two sensors 21 which are located on a running gear 13 and coupled to the pick-up 20. Each of these sensors 21, 22 is of the aforementioned type "vibration BLE sensor". These vibration BLE sensors are battery-operated, with a service life of 3 to 9 years. The service life is dependent upon the data transfer cycle to the gateway. In addition to the previously mentioned triple, these oscillation and temperature BLE sensors may transmit their internal status, such as the remaining battery capacity for example, to the background system 27 via gateway 23. Optionally, a transmission of the temperature is likewise possible. Using this additional data, the state of the sensors can therefore also be monitored by the signal processing server in the background system. As a result, the availability of the proposed method and system for wear detection during operation of a conveying system is improved once more and without additional equipment outlay.

LIST OF REFERENCE CHARACTERS, GLOSSARY 1 conveying system, baggage carousel
2 path, closed circulating path
10 conveyor belt
11 blades, rubber blades
12 supporting wheel, polyurethane cylinder; transport roller, wheel
13 running gear
14 blade carrier
15 guide wheel
16 drive unit
17 rail surface
18 rail
19 supporting buffer
20 pick-up 21 sensor on running gear
22 sensor on rail
23 gateway, Wi-Fi gateway, beacon
24 communication sensor 21←→gateway
25 communication sensor 22←→gateway
26 communication←→background system
27 background system, evaluation system
28 signaled wear point
BLE Bluetooth Low Energy
d distance between pick-up and rail surface
O foreign object
r radius of a wheel in non-worn state
V wear, wear point
x displacement of axes of rotation caused by wear

LIST OF CITED DOCUMENTS

[1] CN103458040 (A)
"Equipment abrasion state wireless monitoring device based on Internet of Things" TIANJIN ZHONGTIANYI INFORMATION TECHNOLOGY CO LTD
[2] EP 1 469 278 A1
"Apparatus for measuring the wear of wheels or rollers" SIEMENS AKTIENGESELLSCHAFT, DE-80333 Munich

The invention claimed is:

1. A method for wear detection during operation of a conveying system, the method comprising:
   a) providing a conveying system including at least one running gear circulating in a closed path and containing transport rollers movable on rails, and a pick-up fastened to the running gear and disposed at a predefined distance from a rail surface of a rail;
   b) causing the pick-up to touch the rail surface resulting in oscillation of the pick-up in an event of wear of at least one of the transport roller or the rail due to operation;
   c) using an oscillation sensor coupled to the pick-up to register the oscillations;
   d) wirelessly transmitting the registered oscillations as data from the oscillation sensor to a background system, together with a time stamp and an identity of the oscillation sensor; and
   e) using the background system for analyzing the data transmitted in step c) and, in an event of deviations, detecting the data as wear and signaling the wear by issuing a message.

2. The method according to claim 1, which further comprises:
   f) using two rails to define the path;
   g) fastening at least one fixed oscillation sensor to each respective rail;
   h) using the at least one fixed oscillation sensor to register the oscillations generated by a transport roller rolling past and having wear;
   i) transmitting the oscillations registered in step h) as data to the background system, together with a time stamp and an identity of the fixed oscillation sensor; and
   j) performing step e) for the data transmitted in step i).

3. The method according to claim 2, which further comprises installing a gateway at a fixed location along the path, setting a zero time each time a running gear having a sensor passes, and using the gateway to transmit the data from the sensors to the background system.

4. The method according to claim 1, which further comprises detecting the deviations by a statistical comparison with preceding registrations or by a comparison with a fixed magnitude.

5. The method according to claim 1, which further comprises transmitting state data of each sensor in addition to the registered oscillations.

6. The method according to claim 2, wherein the state data of each sensor contains a remaining battery capacity and its temperature.

7. The method according to claim 6, which further comprises issuing a message according to step e) upon falling below a specified battery capacity or exceeding a particular temperature.

8. A conveying system, comprising:
   a) at least one running gear circulating on rails along a closed path, said at least one running gear containing transport rollers and a pick-up fastened to said at least one running gear and disposed at a predefined distance from a surface of a rail;
   b) said pick-up touching the rail surface resulting in oscillation of said pick-up in an event of wear of at least one of said transport roller or the rail occurring during operation of the conveying system;
   c) an oscillation sensor coupled to said pick-up for registering the oscillations;
   d) a background system receiving the registered oscillations wirelessly transmitted by said oscillation sensor together with a time stamp and an identity of said oscillation sensor; and
   e) said background system analyzing said wirelessly transmitted oscillations and the time stamp, detecting deviations as wear and signaling the wear by issuing a message.

9. The conveying system according to claim 8, wherein:
   f) two rails define said path;
   g) at least one fixed oscillation sensor fastened to each respective rail is configured for registering oscillations generated by a transport roller rolling past and having wear and is configured for transmitting said oscillations to said background system;
   h) said at least one fixed oscillation sensor registers said oscillations generated by said transport roller rolling past and having wear; and
   i) said background system receives said oscillations registered by said at least one fixed oscillation sensor together with a time stamp and an identity of said at least one fixed oscillation sensor.

10. The conveying system according to claim 8, wherein said deviations are detected by a statistical comparison with preceding registrations or by a comparison with a fixed magnitude.

11. The conveying system according to claim 9, wherein state data of each sensor are transmitted in addition to the registered oscillations.

12. The conveying system according to claim 11, wherein each sensor is operated by a battery and said state data of each sensor contains its temperature and a remaining battery capacity.

* * * * *